No. 839,397. PATENTED DEC. 25, 1906.
A. T. MAENCHE.
GAGE FOR LACING HOOK MACHINES.
APPLICATION FILED MAR. 18, 1904.
2 SHEETS—SHEET 1.
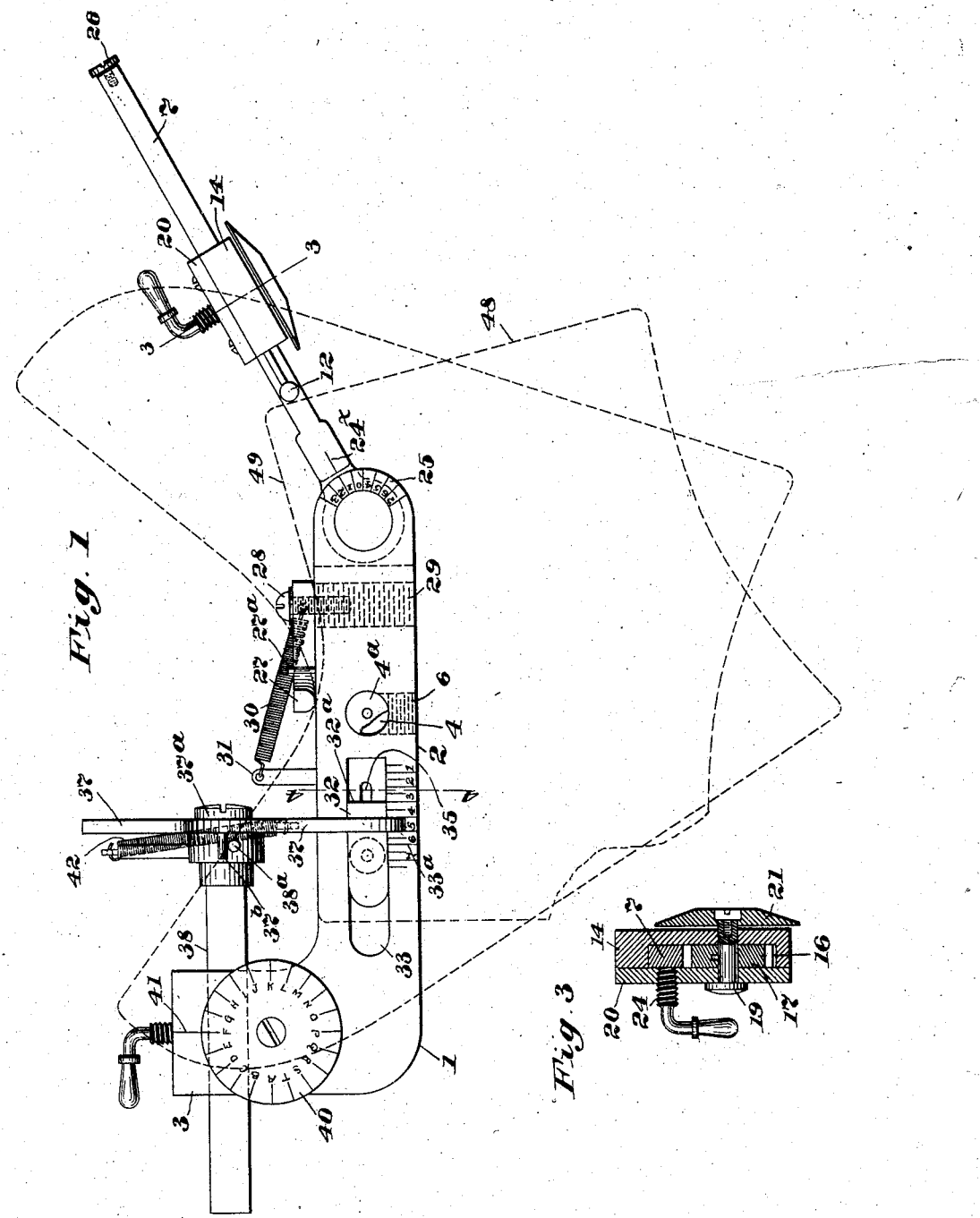
Witnesses:
Horace A. Crossman
Everett S. Emery
Inventor:
Albert T. Maenche
by Emery, Booth & Varnell
Attys.

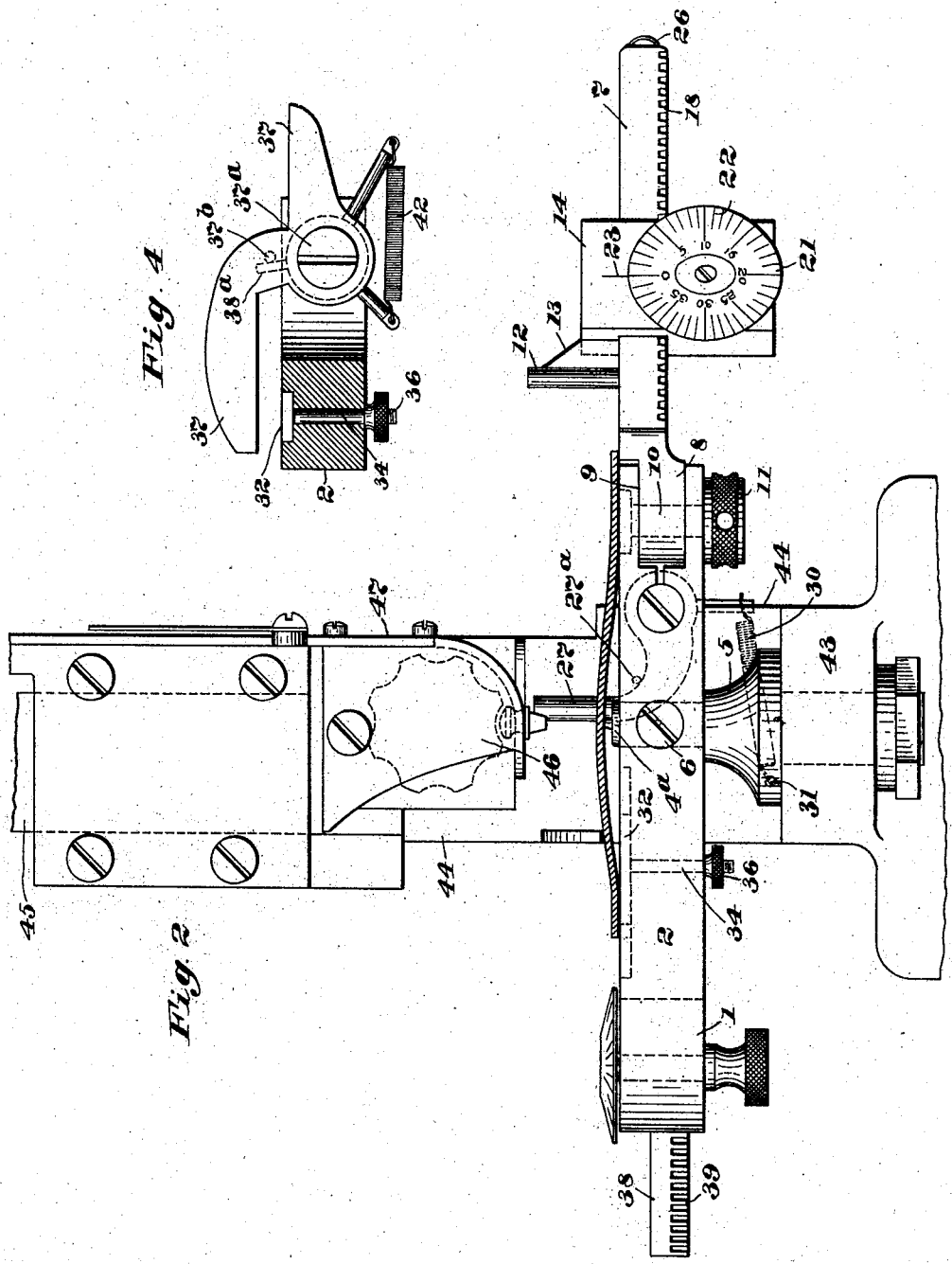

UNITED STATES PATENT OFFICE.

ALBERT T. MAENCHE, OF WALTHAM, MASSACHUSETTS, ASSIGNOR TO AMERICAN LACING HOOK COMPANY, OF WALTHAM, MASSACHUSETTS, A CORPORATION OF NEW JERSEY.

GAGE FOR LACING-HOOK MACHINES.

No. 839,397.      Specification of Letters Patent.      Patented Dec. 25, 1906.

Application filed March 18, 1904. Serial No. 198,782.

*To all whom it may concern:*

Be it known that I, ALBERT T. MAENCHE, a citizen of the United States, residing at Waltham, in the county of Middlesex and Commonwealth of Massachusetts, have invented an Improvement in Gages for Lacing-Hook Machines, of which the following description, in connection with the accompanying drawings, is a specification, like numerals on the drawings representing like parts.

The aim of this invention is to provide certain adjustments for the parts of a gage for machines for setting or operating upon lacing-hooks or equivalent or kindred devices, whereby the gage will be adapted for universal application—that is to say, the invention contemplates a gage of such construction and so equipped with means of adjustment and means for determining the extent of such adjustment of the parts as to render the gage capable, without alteration or addition, of use with all styles of all grades of shoes. Gages of this particular class as at present constructed are capable of such limited adjustment as to make it necessary to use a different gage for all grades beyond a narrow range of shoes operated upon; and, furthermore, such limited provision has heretofore been made for properly determining the required adjustments that it has been usually necessary in sending out a gage to be fitted to a hook-setting machine to send also a skilled mechanic to mark the gage with graduations suited to the particular kinds of work for which it is to be used.

The character and scope of my invention will be clearly apparent from a description of one embodiment thereof, illustrated in the accompanying drawings, in which—

Figure 1 is a plan view of the gage detached, with parts of a shoe in position to be operated upon indicated in dotted outline. Fig. 2 is a front elevation of the gage device in position. Fig. 3 is a section on the line 3 3 of Fig. 1. Fig. 4 is a section on the line 4 4, Fig. 1.

In the particular embodiment of my invention herein selected for illustration the gage device is composed of a work-table 1, which may be of any suitable form and material; but as here shown it comprises a substantially L-shaped steel bar rectangular in cross-section and shaped to present a transverse long arm 2 and a rearwardly-extending short arm 3. At approximately the middle of the transverse arm 2, Fig. 1, the table is provided with a socket 4, adapted to receive a supporting-post 5, projecting from the frame of the hook-setting machine upon which the gage is to be used. Within this socket also may be positioned an anvil 4$^a$. Adjacent the post-socket 4 the table is provided with a set-screw 6, by which it is firmly held in position upon the post 5. At the outer extremity of the long arm 2 of the work-table 1 is pivotally mounted an arm or bar 7, which may be secured to the table in any suitable manner; but in this instance said bar is provided with a head 8, adapted to be held within a horizontal socket 9, formed in the end of the arm 2, by means of a pivot 10, said pivot being headed at its upper end, as shown, and fixed against rotation in any convenient manner. The lower end of the pivot 10 preferably passes loosely through the portion of the table below the socket 9 and is screw-threaded to receive a knurled nut 11, whereby the arm 7 may be clamped in adjusted position.

Slidably mounted upon the arm 7 is a so-called "top gage" 12, which may be of any desired form suited for its intended purpose; but in the embodiment thereof herein selected said gage consists of an upright cylindrical post 12, which is connected by a web 13 with suitable adjusting means, consisting in this instance of a block 14, mounted to slide on the arm 7. Referring to Fig. 3, the block 14 is provided with a chamber 16 below the arm 7, in which is mounted a small gear 17, which meshes with a rack 18 on the lower side of said bar 7. This gear 17 is fast upon a short shaft 19, journaled in the front wall of the chamber and also in a back plate 20 thereof, and upon the projecting front end of said shaft beyond is fixed an index-disk 21, provided with a graduated scale 22 adjacent the perimeter thereof and adapted to register with a fixed mark 23 on the front face of the block 14. A set-screw 24, projecting through the back plate 20 and normally engaging the bar 7, serves to fix the block and its top gage 12 in adjusted position upon said bar. By the mechanism just described the top gage 12 may be readily fixed in predetermined position along the bar 7 for use in operating upon a given style and grade of shoe. The upper surface of the bar 7 is preferably flush with the surface of the table 1 and is provided with a registering-mark 24$^x$, Fig. 1, which is adapted to register with the graduations of a scale 25 on the adjacent end of the table 1 to determine the angular position of the arm with respect to the table necessary for different styles and grades of shoes. Upon the outer extremity of the arm 7 is provided a suitable stop, such as a screw 26, to retain the gage upon said bar.

At the rear of the arm 2 of the table 1 is located a suitable edge-guide 27, whose function is to determine the distance from the edge of the upper at which the hooks are to be set. The guide 27 may be of any suitable construction; but as here shown it consists of a short curved lever pivoted upon a screw 28, which is threaded into the rear end of a holding-screw 29, reaching through the table 1 from front to rear thereof. By turning the screw 29 the guide 27 may be readily adjusted toward and from the table 1 and the anvil 4$^a$ thereon. The guide 27 is held in normal elevated position, as shown in Fig. 1 of the drawings, by a spring 30, attached at its opposite extremities to the gage 27 and to a fixed pin 31 on the table 1.

In a depression 33 in the surface of the table 1, near the angle thereof, is a second top gage 32 for use with right-hand uppers, said gage consisting of a thin flat plate provided with a threaded shank 34, depending through a slot 35 in the table 1 and receiving a nut 36 to secure the plate 32 in adjusted position. Adjacent one edge of the depression 33 may be a graduated scale 33$^a$ to determine the adjustment of the plate or top gage 32, the inner end of the latter or that nearest the anvil 4$^a$ being provided with a straight edge 32$^a$, which registers with said scale 33$^a$, whereby the gage 32 may be properly positioned for its intended purpose.

Projecting over the table 1 to the left of the anvil-socket 4 is a hook-gage 37, pivotally mounted at 37$^a$ upon a longitudinally-movable bar 38, which may be supported in the rearwardly-projecting arm 3 of the work-table 1. The bar 38 is provided with a rack 39, which through connections in all respects similar to those described for the adjustment of the top gage 12 operates a graduated disk 40, which registers with a fixed mark 41 on the table 1 to determine the lateral adjustment of the hook-gage 37 with relation to the anvil-socket 4. A suitable spring 42 holds the gage 37 normally depressed over the table, in which position it is stopped by a pin 37$^b$ contacting with any suitable stop-surface, as a pin 38$^a$ on the bar 38, whereby the gage is in position to engage the lacing-hooks in an upper as the latter is fed over the anvil 4$^a$. Suitable means (not shown) attached to a moving part of the machine and operating upon the tail of the gage 37 serves to lift the said gage periodically away from the table 1, and consequently out of the path of the hooks on the upper, and to retain the same in such position for a brief period after the setting of a hook in order that the upper, with its attached hooks, may be fed beneath the gage.

In the construction herein selected for illustration the supporting-post 5 is shown as attached to a projection 43 on the frame 44 of a hook-setting machine. In the frame also a suitable plunger 45 is mounted for vertical reciprocation, said plunger being provided at its lower extremity with a centering-wheel 46, which receives the hooks from a raceway 47 on the side of the frame and positions them over the anvil 4$^a$.

The operation of the machine is is follows;

When it is desired to secure lacing-hooks in a left-hand upper, the arm 7, carrying the top gage 12, is adjusted according to the scale 25 at an angle to the table 1, suited to the particular grade and style of shoes operated upon, for as is well known to those familiar with this art the contours of the front edges of shoe-uppers differ radically in different grades and styles and sizes of shoes. The top gage 12 is next adjusted along the arm 7 to the desired position, and the edge-guide 27 and hook-gage 37 are also properly adjusted relative to the anvil 4$^a$, the one to determine the distance of the hooks from the front edge of the upper and the other the spacing of the hooks. With the gages thus properly set the upper edge 48 of the upper is brought against the top gage 12 at a distance from the front edge of the upper equal to that at which the hooks are to be spaced therefrom. The front edge 49 of the upper is also positioned against the edge-guide 27, thus positioning the upper to receive the lowest hook. The plunger 45 is now operated in any well-known manner to set the first hook, and upon the rising thereof the upper, with its attached hook, is fed to the left by the operator until the hook engages the right side of the gage 37. The plunger 45 in its descent engages the upper extremity of the edge-guide 27 and depresses the same against the tension of its spring 30, and upon the rising of the plunger said spring returns the guide to its normal operative position, determined by a stop-pin 27$^a$, Fig. 1, contacting with the upper surface thereof. Upon the next descent of the plunger a second hook is set at a distance from the first determined by the adjustment of the gage 37 relatively to the anvil 4$^a$, and at the same time the gage is raised out of the path of the hook arrested thereby, so that immediately upon release of the upper by the plunger said upper may be again fed to the left, as before, this operation being repeated until the desired number of hooks is set. In order to position the hooks in a right-hand upper, the edge 32ª of the second gage 32 is set at the proper distance from anvil 4ª to determine the position of the first, in this case the top, hook from the upper edge of the upper, the edge-guide, as before, determining its position relatively to the front edge thereof. Upon setting the first hook the upper is fed to the left, and the remaining hooks are set in the manner described for left-hand uppers.

The adjustability of the top gage-arm 7 relatively to the table 1 makes it possible to adapt the gage to every possible degree of curvature of uppers of all degrees of shoes, while the extent and minute degree of graduation of the scales for the various gages renders the gage as a whole adaptable to any possible variations in the positioning of lacing-hooks in shoes without alteration or addition to the gage after it leaves the hands of the manufacturer.

By arranging the adjusting graduations upon wheels or disks, as shown, which are larger in diameter than the gears which rotate them the relative movement between the graduation or adjusting marks is amplified for a given movement of the guide upon its support or bar as compared with the movement between said guide and its support or bar, rendering it easier to make fine adjustments, and, if desired, the disks or wheels themselves may be availed of as means for actually effecting the relative movements or adjustments.

My invention is not limited to the exact construction herein shown and described, inasmuch as it is obvious that many changes and modifications may be made in the structure and relative arrangement of parts without departing from the spirit thereof.

I claim—

1. In a machine for setting lacing-hooks, an anvil, a work-table, a top gage supported therefrom, and means whereby said top gage may be adjusted toward and from and also angularly with respect to said anvil.

2. In a machine for setting lacing-hooks an anvil, a top gage, a support for said top gage adjustable relatively to said anvil, and means to adjust said top gage on said support in a direction transecting the line of adjustment of the support itself.

3. In a machine for setting lacing-hooks an anvil, a top gage, a support for said top gage angularly adjustable relatively to said anvil and means to adjust said top gage upon said support.

4. In a machine for setting lacing-hooks an anvil, a top gage, an angularly-adjustable support for said top gage, and a scale fixed with relation to said anvil whereby said support may be adjusted to predetermined position relatively to said anvil.

5. In a machine for setting lacing-hooks an anvil, a work-table adjacent said anvil, a top gage, a top-gage support mounted on said table and angularly adjustable relatively thereto, and means to adjust said top gage toward and from said anvil.

6. In a machine for setting lacing-hooks a work-table, an anvil in said table, a top gage, a support for said top gage pivoted to said table whereby said support may be adjusted relatively to said anvil, and means to adjust said top gage longitudinally of said support.

6. In a machine for setting lacing-hooks, an anvil, a work-table, a top gage, an adjustable support from said work-table for said top gage, means on said support to adjust said top gage, and an indicator movable with and relatively to said top gage and provided with means coöperating with the said means on said support to cause said relative movement of the indicator.

8. In a machine for setting lacing-hooks the combination of an anvil, an edge-guide and a hook-gage with a top gage angularly adjustable relatively to said anvil.

9. In a gage for setting lacing-hooks the combination of a work-table, an anvil, an edge-guide and a hook-gage, said edge-guide and hook-gage being adjustable relatively to said anvil and a top gage angularly adjustable relatively to and also adjustable toward and from said anvil.

In testimony whereof I have signed my name to this specification in the presence of two subscribing witnesses.

ALBERT T. MAENCHE.

Witnesses:
WILLIAM P. BARTEL,
RALPH C. POWELL.